United States Patent
Croket

[11] Patent Number: 6,117,339
[45] Date of Patent: Sep. 12, 2000

[54] SEALING ARRANGEMENT FOR FILTER BELT

[75] Inventor: Frank M. Croket, Louisville, Ky.

[73] Assignee: Advanced Filtration Concepts, Louisville, Ky.

[21] Appl. No.: 09/433,091

[22] Filed: Nov. 3, 1999

Related U.S. Application Data

[62] Division of application No. 09/035,569, Feb. 19, 1998.

[51] Int. Cl.⁷ .......................... B01D 33/056; B01D 29/09
[52] U.S. Cl. .......................... 210/780; 210/168; 210/387
[58] Field of Search .................................. 210/400, 168, 210/401, 783, 780, 387, 196

[56] References Cited

U.S. PATENT DOCUMENTS

| | | | |
|---|---|---|---|
| 3,464,557 | 9/1969 | Fowler | 210/97 |
| 3,899,426 | 8/1975 | Hirs | 210/387 |
| 4,137,169 | 1/1979 | El-Hindi | 210/97 |
| 4,145,288 | 3/1979 | Crowe | 210/111 |
| 4,147,635 | 4/1979 | Crowe | 210/401 |
| 4,159,948 | 7/1979 | Crowe | 210/111 |
| 4,390,428 | 6/1983 | Bratten | 210/400 |
| 4,421,647 | 12/1983 | Estabrook et al. | 210/387 |
| 4,481,108 | 11/1984 | Bratten | 210/137 |
| 4,693,836 | 9/1987 | Wilson | 210/791 |
| 5,008,007 | 4/1991 | Anderson . | |
| 5,089,143 | 2/1992 | Anderson | 210/741 |
| 5,221,469 | 6/1993 | Nehls . | |
| 5,279,734 | 1/1994 | Nehls . | |
| 5,601,729 | 2/1997 | Bratten | 210/783 |

*Primary Examiner*—Thomas M. Lithgow
*Attorney, Agent, or Firm*—Polster, Lieder, Woodruff & Lucchesi

[57] ABSTRACT

An method for filtering particulate materials from a fluid stream wherein a dirty fluid stream is passed through a moveable filter media and the cleaned fluid stream is recirculated in part to form filter media by-pass presenting liquid curtains along the side edges of said filter media.

3 Claims, 3 Drawing Sheets

SEALING ARRANGEMENT FOR FILTER BELT

This is a divisional of application Ser. No. 09/035,569 filed on Feb. 19, 1998, now pending.

BACKGROUND OF THE INVENTION

The present invention relates to a sealing apparatus and method of sealing a moveable filtering medium and more particularly to an improved apparatus and method for filtering particulate materials from a dirty fluid stream which is passed through a flight of an endless filter medium belt or a strip of continuously fed filter medium with a portion of the recirculated clean fluid being utilized along the side edges of the filter medium for sealing.

In the prior art, U.S. Pat. No. 4,159,948, issued to William D. Crowe on Jul. 3, 1979, the broad principle of sealing the side edges of a filter belt with clean fluid recirculated from a reservoir below the filter medium treating sight for a dirty fluid stream is disclosed, attention being particularly directed to FIGS. 4 and 5 of this patent. However, in this patent the filter medium is advanced by an indexed pinch roller and the clean fluid is applied to the filter medium through spaced grooves in side edge sealing members immediately adjacent the side edges of the filter medium. The cleaning operation of the side edges in this patent is accomplished through a comparatively complex control arrangement during down-time of filtering operations. Further, a substantial wear on the filter medium side edges occurs through the recirculated water receiving grooved side edge sealing members and the accompanying pulling forces exerted on the filter medium by the pinch rollers. In later issued patents, such as U.S. Pat. No. 4,390,428, issued to Jack R. Bratten on Jun. 28, 1983, which teaches the utilization of an inflatable seal tube abutting the side edges of an endless filter belt, and U.S. Pat. No. 4,421,647, issued to Mark R. Estabrook et al on Dec. 20, 1983, which teaches sealing the side edges of filter medium by forcing the side edges of the medium into grooves, similar filter medium wear problems have occurred, along with the required utilization of comparatively complex structures to accomplish the medium sealing. Even in later U.S. Pat. Nos. 4,481,108 and No. 5,601,729, issued to Jack R. Bratten on Nov. 6, 1984 and Feb. 11, 1997, respectively, the use of disclosed wear inflicting, inflatable sealing tubes has been relied upon for sealing side edge sealing of filter medium, necessarily resulting in the aforedescribed undue wear of the filter medium. Also in these aforementioned patents the major problem of solids bypassing the medium from the dirty to the clean side of the system, occurs during the indexing movement of the filter medium when the sealing tubes have been deflated to permit filter medium movement.

The present invention recognizing certain of the problems recognized by the prior art, as well as problems created by prior art solutions, avoids the same with a unique structure and method which is straightforward and economical in construction, operation and maintenance-requiring a comparative minimum of parts and a comparative minimum of steps in resolving prior art difficulties. Further, the present invention uniquely utilizes the sealing machinery itself, to further supplement the novel sealing arrangement of the present invention.

Various other features and advantages of the present invention will become obvious to one skilled in the art upon reading the disclosure set forth herein.

BRIEF SUMMARY OF THE INVENTION

More particularly the present invention provides a fluid filter apparatus comprising: fluid receiving tank means including a first tank section to receive a dirty fluid to be filtered from a dirty fluid source and a successive second tank section to receive remaining clean fluid after it has been filtered; longitudinally extending porous filtering means having opposed side edges moveable in a plane between the first and second tank sections, the filtering means being adapted to separate out particulate matter from the dirty fluid as it is passed from the first tank section to the successive second tank section; fluid recirculating means to recirculate a portion of the clean fluid in the second tank section to the first tank section; fluid dispensing sealing means connected to the fluid recirculating means in spaced alignment with at least the opposed side edges of the porous filtering means so as to direct clean fluid extended curtains along the opposed side edges of the porous filtering means restricting dirty fluid into the first tank section from by-passing the filtering means by flowing around the opposed side edges of the filtering means thus insuring passage of the dirty fluid through the longitudinally extending porous filtering means; and, power means associated with the moveable filtering means and the fluid recirculating means to appropriately energize the same in accordance with a preselected adjustable program. In addition, the present invention provides a unique method of filtering particulate materials from a dirty fluid stream comprising: passing the dirty fluid stream from a dirty fluid receiving zone through a filtering zone to filter particulate materials from the dirty fluid stream; passing the cleaned fluid stream into a cleaned fluid receiving zone; and, recirculating a portion of the cleaned fluid from a cleaned fluid receiving zone back to the dirty fluid zone, forming extended clean liquid curtains along select side edges thereof to prevent the by-passing of dirty fluids around the filtering zone.

It is to be understood that various changes can be made by one skilled in the art in one or more of the several parts of the inventive apparatus described herein and in one or more of the several steps of the inventive method described herein without departing from the scope or spirit of the present invention. For example, the method and apparatus for discharging clean liquid fluid, as well as the discharge patterns can be modified in accordance with desired results.

BRIEF DESCRIPTION OF THE DRAWINGS

Referring to the drawings which disclose one advantageous embodiment of the present invention and a modification thereof.

DETAILED DESCRIPTION OF THE DRAWINGS

Figure 1:
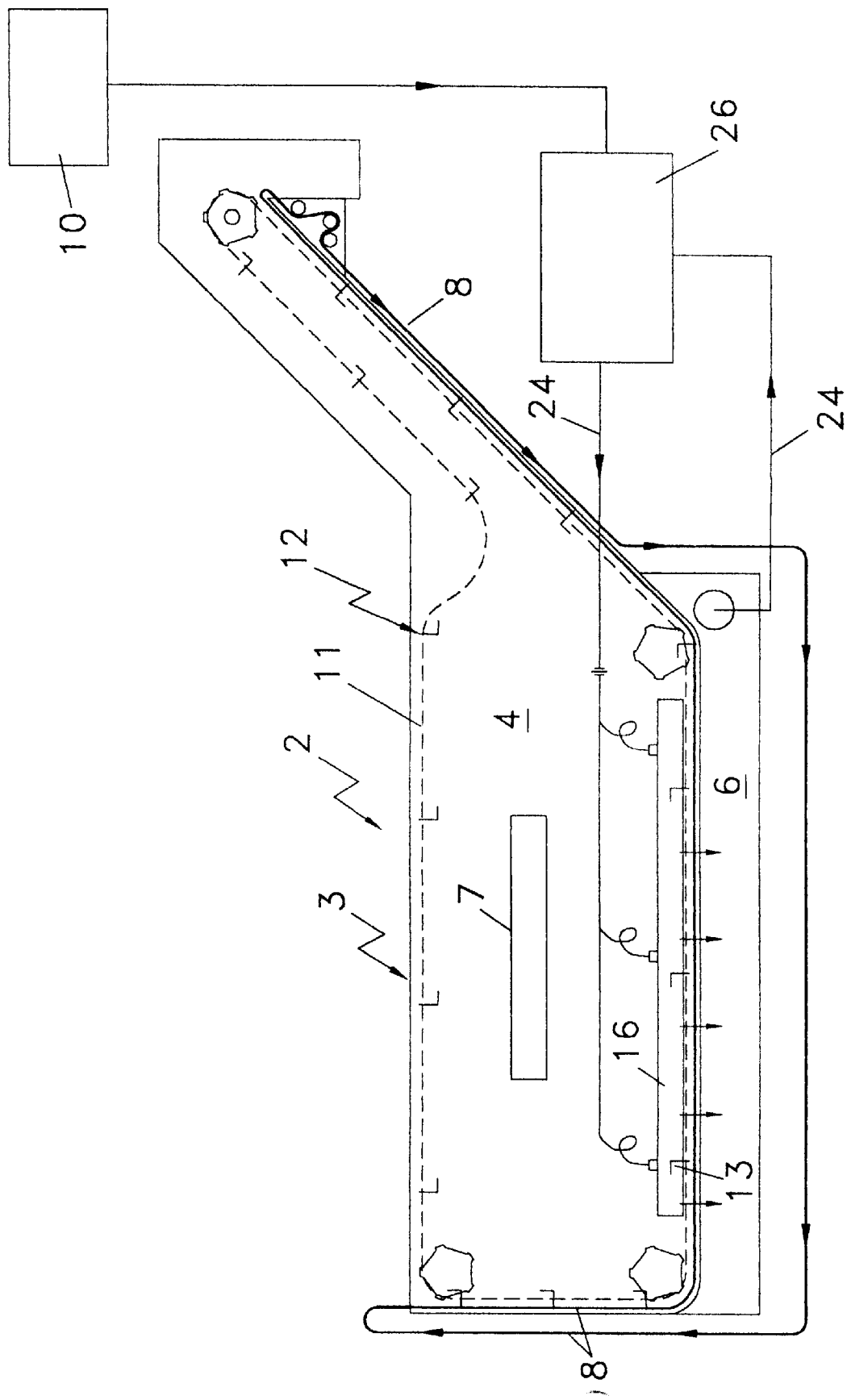
FIG. 1 is an overall schematic view of a typical particulate separating filter apparatus disclosing an endless filter belt with which the inventive sealing arrangement can be employed.
Figure 2:
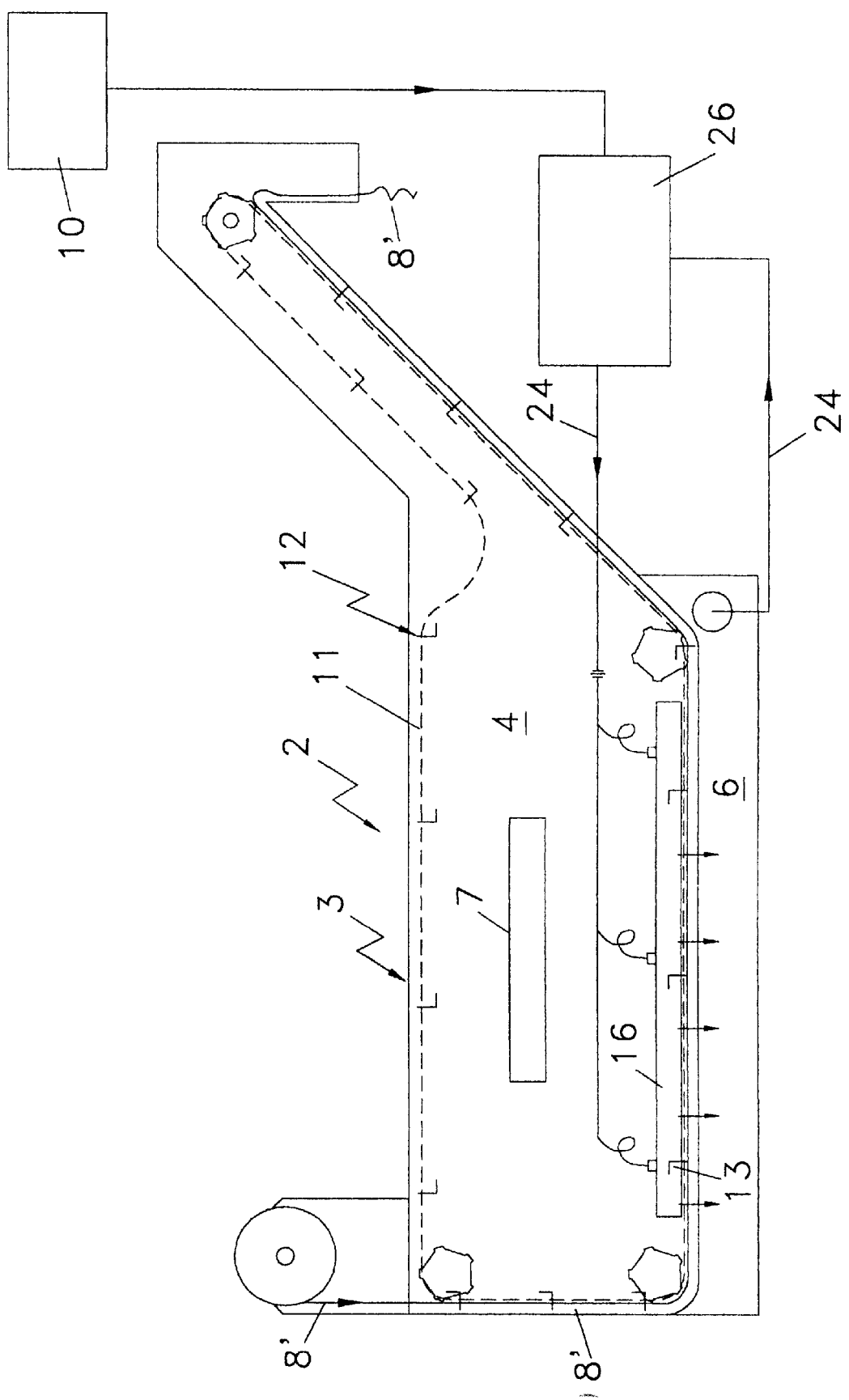
FIG. 2 is an overall schematic view of a similar typical particulate separating filter apparatus disclosing a continuously fed disposable filter medium with which the inventive sealing arrangement can be employed.

Referring to FIGS. 1 and 2 of the drawings, disclosed in each drawing is a typical particulate separating liquid filter apparatus for filtering out particulate materials from dirty liquid streams which, for example, can include particulate metallic particles gathered from machining operations by conventional metal working machines. Filter apparatus 2 includes a horizontally extending dirty liquid receiving tank 3 which incorporates an upper first section 4 disposed between the opposed side walls of tank 3 to receive a dirty liquid stream carrying particulate matter to be separated by a suitable filter medium described in more detail hereinafter. A lower second section 6 below first section 4 and also between the opposed side walls of tank 3 serves to receive the clean liquid after particulate matter has been separated from a dirty liquid stream introduced into the first section 4 through dirty liquid inlet 7. In FIG. 1 of the drawings, an endless filter medium strip 8, mounted on endless conveyor 11 schematically disclosed by reference numeral 11 in the schematic system of FIG. 1 of the drawings, can be seen more readily in the more detailed, enlarged cross-section disclosure of FIG. 3 of the drawings. A suitable porous filter medium can be utilized for filter medium strip 8, the filter medium being selected in accordance with the particulate matter to be removed and the liquid stream carrier industrially involved. It is to be understood, that instead of an endless filter medium 8, a continuous disposable filter medium 8 can be employed with the present invention, as can be seen in FIG. 2 of the drawings.

Figure 3:
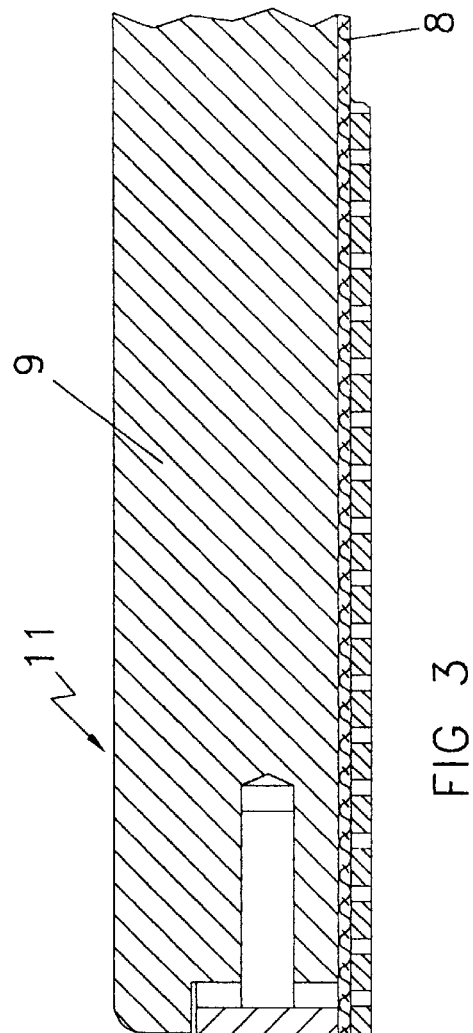
FIG. 3 is an enlarged cross-sectional detailed view of a portion of a filter apparatus such as schematically disclosed in FIGS. 1 and 2, disclosing only one of two mirror-image sides of the inventive sealing arrangement incorporated therein; and, FIG. 4 is an isometric view of a modified discharge orifice arrangement for the liquid conduit of FIG. 3.

As can be seen in FIG. 3 of the drawings, adjacent and parallel rungs 9 (only one of which is disclosed) extend between a spaced pair of endless chains 14 of an endless conveyor 11. In the embodiments disclosed in FIGS. 1 and 2 of the drawings, each endless conveyor 11 includes an upper flight 12 and a lower flight 13, with the lower flight 13 traveling between the first or dirty liquid section 4 of receiving tank 3 and the second or clean liquid section 6 of receiving tank 3. It is to be noted that in the embodiments disclosed, the bottoms of the adjacent parallel rungs 9 are treated with a gritted engaging surface so as to engage with the upper surfaces of each of the filter mediums 8 (FIG. 1) and 8' (FIG. 2) to move the respective filter mediums 8 an 8' therealong. It is further to be noted that each of rungs 9 can be of a suitable plastic or fiberglass material with a course or gritted bottom as aforedescribed. The spaced endless chains 14 of endless conveyor 11 are disposed adjacent opposed side walls of the first or upper section 4 of receiving tank 3 with spaced rung members 9 fixed to and extending between endless chains 14. The upper and lower flights of endless conveyor 11 in the embodiments disclosed pass between and through the first section 4 of the tank 3. However, it is to be understood that other arrangements of the flights of the endless conveyor could be utilized.

As can be seen in FIGS. 1 and 2 of the drawings, a pair of longitudinal, horizontally extending liquid conduits 16 (only one of which can be seen since only one mirror-image side wall is disclosed) are attached to the opposed mirror-image side walls of the first tank section 4 of tank 3 to extend in substantially spaced parallel relation to each other above opposite side edges of moveable filter mediums 8 and 8'. As can be seen more clearly in FIG. 3, each fluid conduit 16 is suspended from a plurality of horizontally and linearly spaced stud wall mounting assemblies 17 fastened to the inner faces of opposed side walls of tank 3. The spaced stud wall mounting assemblies 17, each have an adjustable, threaded shoulder bolt 18 engaging the distal end thereof to provide a slot between the shoulder of bolt 18 and stud 17 to engage loosely with a slot 19 in a first longitudinally and horizontally extending baffle 21 adjacent one extremity thereof. The other end of baffle 21 is fastened to the outside wall face of fluid conduit 16 along the upper portion thereof so that each conduit floatingly engages in slots 19. A second longitudinally and horizontally extending baffle 22 is fastened to each of floatingly mounted liquid conduits 16 along the outer wall face of the liquid conduit to floatingly abut endless conveyor chain 14. In this regard, it is to be noted that each of the longitudinally and horizontally extending conduits 16 with their respective upper and lower baffle members 21 and 22 respectively form one of a pair of solid physical barriers spaced from opposed side wall of receiving tank 3 to physically restrain dirty liquid introduced into the first upper tank 4 from by-passing the filter medium 8 by flowing around the side edges thereof.

As can be seen in FIG. 3, the floating liquid conduits 16 are each provided along the bottom portion thereof with a series of spaced fluid outlet orifices 23 which are arranged to direct an extended liquid curtain of clean recirculated liquid against each of the opposed side edges of filter media 8 or 8' (only one of these spaced orifices 23 being disclosed in FIG. 3). This extended liquid curtain serves as a further barrier, besides the aforedescribed solid barrier, to restrain dirty liquid introduced into the tank section 4 from by-passing filter medium 8 or 8' (as the case might be) by flowing around the side edges of filter medium 8 or 8' and flowing into the otherwise clean fluid tank section 6.

As can be seen in FIGS. 1 and 2 of the drawings, a portion of the clean fluid is recirculated by conduit 24 from the vacuum clean fluid section 6 with remainder of clean fluid being recirculated for reuse at an industrial machine source. To accomplish the timed recirculation of cleaned liquid and the timed movement of endless conveyor 11 an appropriate power source 26 is provided. Power source 26 is disclosed schematically in FIGS. 1 and 2 and can include (but not shown) an appropriately selected liquid pump connected to recirculating conduit 24, a drive motor connected to endless drive chain 14 and preselectively set adjustably programmed timing controls for the liquid pump and drive motor. As clean liquid runs low, additional clean liquid can be furnished from clean liquid supply 10.

Figure 4:
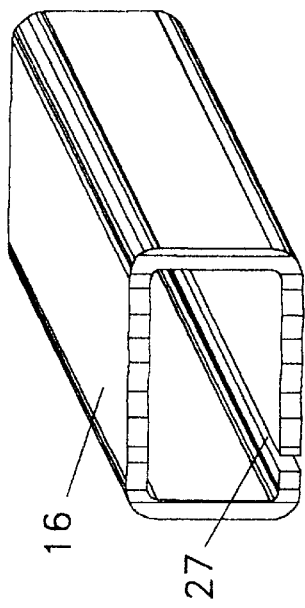

As can be seen in FIG. 4 of the drawings, the discharge orifice for fluid conduits 16 can be in the form of extended longitudinal slits 27 and that the discharge orifices can include adjustable mechanism to provide venturi-like discharge arrangements.

In accordance with the present invention, a unique method of filtering a dirty fluid stream is provided which includes the steps of passing the particulate carrying dirty fluid stream from a dirty fluid receiving zone (first tank section 4) through a filtering zone (filter medium 8 or 8') to filter particulate contaminants from the dirty fluid stream; passing the cleaned fluid stream into a cleaned fluid receiving zone (second section 6); and recirculating a portion of the cleaned fluid from the cleaned fluid receiving zone back to the dirty fluid zone, forming extended liquid curtains directed against the side edges of the filtering zone to prevent by-passing of dirty fluids around the filtering zone. In addition, the present invention provides for the liquid forming curtain means in the dirty fluid to be arranged along the zone to further physically prevent dirty fluid from by-passing the dirty fluid zone and being introduced into the clean fluid receiving zone.

The invention claimed is:

1. A method of filtering particulate materials from a dirty fluid stream comprising: passing said dirty fluid stream from a dirty fluid receiving zone through a filtering zone to filter particulate materials from said dirty fluid stream; passing said cleaned fluid stream into a cleaned fluid receiving zone;

and, recirculating a portion of said cleaned fluid from said cleaned fluid receiving zone back to said dirty fluid zone, forming extended clean fluid curtains by means directed from a spaced and removed position toward and along select side edges of the filtering zone to prevent by-passing of dirty fluids around said filtering zone.

2. The method of claim 1, wherein said spaced and removed extended fluid forming curtain means in said dirty fluid zone is arranged along said zone to further physically prevent dirty fluid by-pass around said filtering zone into said clean fluid receiving zone.

3. The method of claim 2, wherein said spaced and removed extended fluid forming curtain means is arranged above and along select side edges of said filtering zone.

\* \* \* \* \*